United States Patent
Chang et al.

(10) Patent No.: US 8,310,217 B2
(45) Date of Patent: Nov. 13, 2012

(54) POWER CONVERSION CIRCUIT FOR DECENTRALIZING INPUT CURRENT

(75) Inventors: Shih-Hsien Chang, Taoyuan Hsien (TW); Jian-Feng Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 608 days.

(21) Appl. No.: 12/467,056

(22) Filed: May 15, 2009

(65) Prior Publication Data

US 2010/0214806 A1    Aug. 26, 2010

(30) Foreign Application Priority Data

Feb. 23, 2009    (TW) .............................. 98105705 A

(51) Int. Cl.
G05F 1/24 (2006.01)
H01F 38/28 (2006.01)

(52) U.S. Cl. ....................................... 323/259; 323/358

(58) Field of Classification Search .................. 323/259, 323/358

See application file for complete search history.

(56) References Cited

U.S. PATENT DOCUMENTS

| 5,359,281 | A | * | 10/1994 | Barrow et al. | 323/284 |
|---|---|---|---|---|---|
| 5,847,949 | A | * | 12/1998 | Jiang | 363/65 |
| 7,498,783 | B2 | * | 3/2009 | Johnson | 323/282 |
| 7,579,814 | B2 | * | 8/2009 | Orr | 323/259 |
| 7,915,872 | B2 | * | 3/2011 | Lee | 323/222 |
| 2002/0154521 | A1 | * | 10/2002 | Francescutti et al. | 363/21.12 |
| 2006/0012348 | A1 | * | 1/2006 | Zhao et al. | 323/259 |
| 2006/0050539 | A1 | * | 3/2006 | Yang et al. | 363/21.16 |
| 2006/0152204 | A1 | * | 7/2006 | Maksimovic et al. | 323/284 |
| 2006/0284606 | A1 | * | 12/2006 | Chen et al. | 323/259 |
| 2007/0096700 | A1 |  | 5/2007 | Weng et al. |  |
| 2007/0096703 | A1 | * | 5/2007 | Jain | 323/282 |
| 2008/0013345 | A1 | * | 1/2008 | Takeshita et al. | 363/21.01 |

FOREIGN PATENT DOCUMENTS

| CN | 1202759 | 12/1998 |
|---|---|---|
| JP | 6217531 | 8/1994 |

* cited by examiner

*Primary Examiner* — Adolf Berhane
*Assistant Examiner* — Gary Nash
(74) *Attorney, Agent, or Firm* — Evan R. Witt; Kirton McConkie

(57) ABSTRACT

A power conversion circuit for decentralizing input current includes a capacitor, a first inductor, a first switching circuit, a first discharging circuit, a second inductor, a second switching circuit, a second discharging circuit, and a control circuit. Under control of the control circuit, the first switching circuit and the second switching circuit are alternately conducted, and the second switching circuit is successively conducted when the first switching circuit is shut off.

13 Claims, 4 Drawing Sheets

POWER CONVERSION CIRCUIT FOR DECENTRALIZING INPUT CURRENT

FIELD OF THE INVENTION

The present invention relates to a power conversion circuit, and more particularly to a power conversion circuit for decentralizing an input current.

BACKGROUND OF THE INVENTION

With increasing industrial development, diverse electronic devices are used to achieve various purposes. An electronic device comprises a plurality of electronic components. Generally, different kinds of electronic components are operated by using different voltages.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable.

FIG. 1 is a schematic block diagram of a conventional power conversion circuit. The conventional power conversion circuit 1 of FIG. 1 is a buck-type power conversion circuit. By the power conversion circuit 1, an AC input voltage $V_{IN}$ (e.g. from a utility power source) is converted into an output voltage $V_o$. As shown in FIG. 1, the power conversion circuit 1 principally comprises a rectifier circuit 11, a bootstrap circuit 12, a control circuit 13, a switching circuit 14, a feedback circuit 15, a diode D, an inductor L, a capacitor C and a current transformer CT. The AC input voltage $V_{IN}$ is rectified by the rectifier circuit 11 into a rectified voltage. The switching circuit 14 includes a switch element Q. A first terminal of the switching circuit 14 is connected to the output terminal of the rectifier circuit 11. A second terminal of the switching circuit 14 is connected to the bootstrap circuit 12. The switching circuit 14 is driven by the bootstrap circuit 12 so as to be conducted or shut off.

The detecting terminal of the current transformer CT is connected to the switching circuit 14 and the inductor L. The output terminal of the current transformer CT is connected to the control circuit 13 and a common terminal COM. When the switching circuit 14 is conducted, the current transformer CT can detect the current flowing through the switching circuit 14, thereby generating a detecting current signal to the control circuit 13. The inductor L is connected to the detecting terminal of the current transformer CT and the output terminal of the power conversion circuit 1. When the switching circuit 14 is conducted, electric energy is stored in the inductor L. Whereas, when the switching circuit 14 is shut off, the inductor L discharges the stored electric energy so as to generate the output voltage $V_o$. An end of the capacitor C is connected to the inductor L and the output terminal of the power conversion circuit 1. The other end of the capacitor C is connected to the common terminal COM. The capacitor C is used for filtering the output voltage $V_o$ that is generated by the inductor L. The cathode of the diode D is connected to the inductor L and the current transformer CT and the anode of the diode D is connected to the common terminal COM, thereby forming a discharging path.

The feedback circuit 15 is connected to the output terminal of the power conversion circuit 1 and the control circuit 13. According to the output voltage $V_o$, the feedback circuit 15 generates a feedback signal to the control circuit 13. The control circuit 13 is connected to the bootstrap circuit 12, the output terminal of the current transformer CT and the feedback circuit 15. The control circuit 13 can generate a control signal. According to the control signal, the operation of the switching circuit 14 is driven by the bootstrap circuit 12. Furthermore, according to the detecting current signal transmitted from the current transformer CT, the control circuit 13 can detect whether an over-current phenomenon occurs. If the over-current phenomenon occurs, the switching circuit 14 is driven by the bootstrap circuit 12 to be shut off according to the control signal. According to the feedback signal transmitted from the feedback circuit 15, the duty cycle of the switching circuit 14 is adjusted, so that the magnitude of the output voltage $V_o$ is maintained above a threshold value.

Although the conventional power conversion circuit 1 is effective to convert the AC input voltage into the output voltage, there are still some drawbacks. For example, since the switching circuit 14 of the power conversion circuit 1 is connected to the high-voltage terminal, the bootstrap circuit 12 is required to drive the switching circuit 14. As known, the switching circuit 14 is very costly and thus the overall cost of the power conversion circuit 1 increases. Furthermore, for filtering the harmonic waves and reducing the electromagnetic interference, the power conversion circuit 1 has an electromagnetic interference (EMI) filter circuit (not shown) connected to the input terminal of the power conversion circuit 1.

Furthermore, the distribution of the AC input current is very centralized during operation of the conventional power conversion circuit 1 and the peak values are relatively higher, higher harmonic waves are possibly generated. As such, the conventional power conversion circuit 1 should have a large-sized electromagnetic interference filter circuit for filtering the harmonic waves and reducing the electromagnetic interference. The use of the large-sized electromagnetic interference filter circuit will increase the fabricating cost of the conventional power conversion circuit 1. Moreover, since the distribution of the AC input current is very centralized, the power factor of the power conversion circuit 1 is too low. Due to the low power factor, the apparent input power is high and more power loss of the power conversion circuit 1 is consumed. Since the conventional power conversion circuit 1 generates the output voltage $V_o$ by means of the single switching circuit 14 and the single inductor L, a great amount of heat is generated by the switching circuit 14 and the inductor L when the output voltage $V_o$ is used for driving a high-power electronic device. Under this circumstance, the switching circuit 14 and the inductor L are possibly damaged due to an over-heating effect and the power conversion circuit 1 fails to be normally operated.

There is a need of providing a power conversion circuit for decentralizing an input current so as to obviate the drawbacks encountered from the prior art.

SUMMARY OF THE INVENTION

An object of the present invention provides a power conversion circuit for decentralizing an input current, in which the switching circuit is no longer connected to the high-voltage terminal so as to reduce the overall cost.

Another object of the present invention provides a power conversion circuit for decentralizing an input current, thereby reducing the heat generation.

A further object of the present invention provides a power conversion circuit for decentralizing an input current, thereby providing a power factor correction function and reducing the power loss without the need of using a large-sized electromagnetic interference filter circuit.

In accordance with an aspect of the present invention, there is provided a power conversion circuit for decentralizing input current. The power conversion circuit generates an output voltage between a first output terminal and a second output terminal. The power conversion circuit includes a capacitor, a first inductor, a first switching circuit, a first discharging circuit, a second inductor, a second switching circuit, a second discharging circuit, and a control circuit. The capacitor is connected to the first output terminal and the second output terminal of the power conversion circuit. The first inductor is connected to the capacitor. The first switching circuit is connected to the first inductor and a common terminal. The first discharging circuit is connected to the first inductor, the first switching circuit and the first output terminal. The second inductor is connected to the capacitor and the first inductor. The second switching circuit is connected to the second inductor and the common terminal. The second discharging circuit is connected to the second inductor, the second switching circuit and the first output terminal. The control circuit is connected to the first switching circuit and the second switching circuit for controlling on/off statuses of the first switching circuit and the second switching circuit, so that the first inductor and the second inductor perform a charging operation or a discharging operation and power conversion circuit generates the output voltage through the first inductor and the second inductor. Under control of the control circuit, the first switching circuit and the second switching circuit are alternately conducted, and the second switching circuit is successively conducted when the first switching circuit is shut off.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
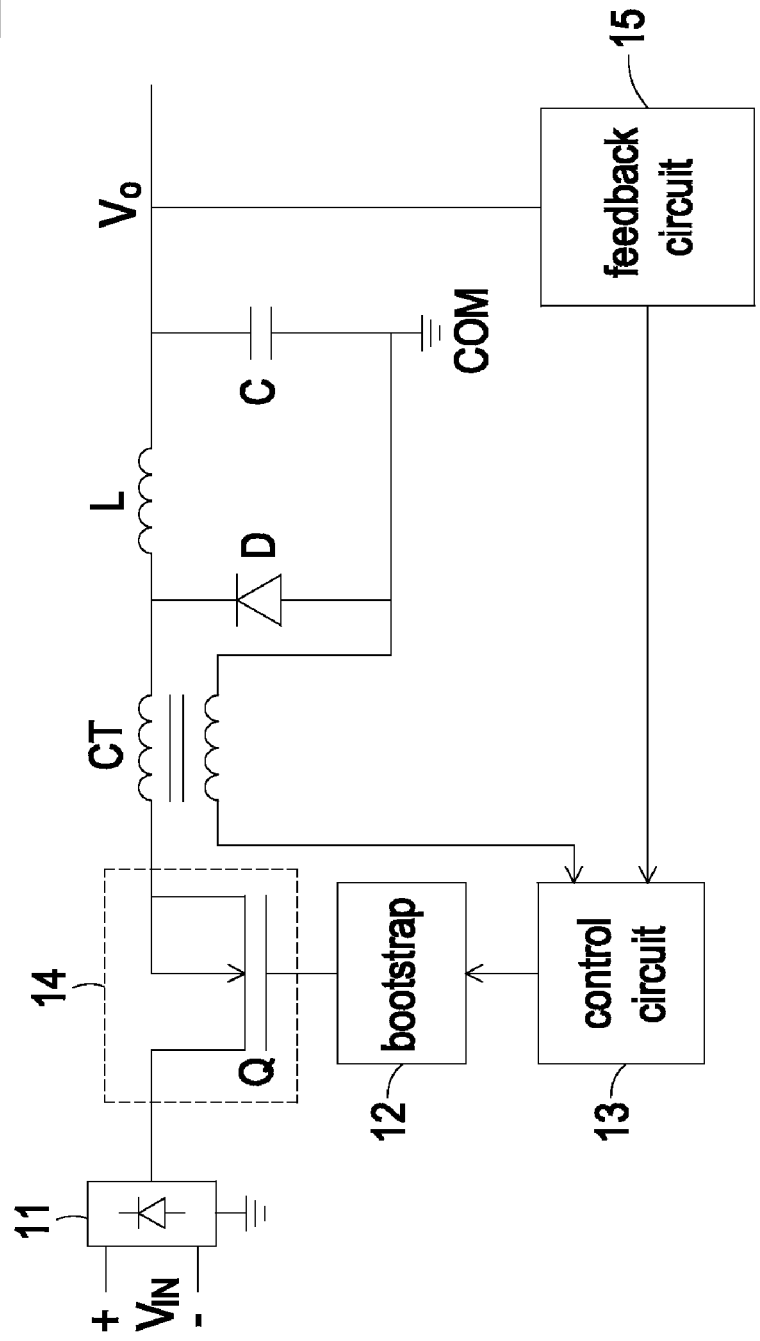
FIG. 1 is a schematic block diagram of a conventional power conversion circuit.
Figure 2:
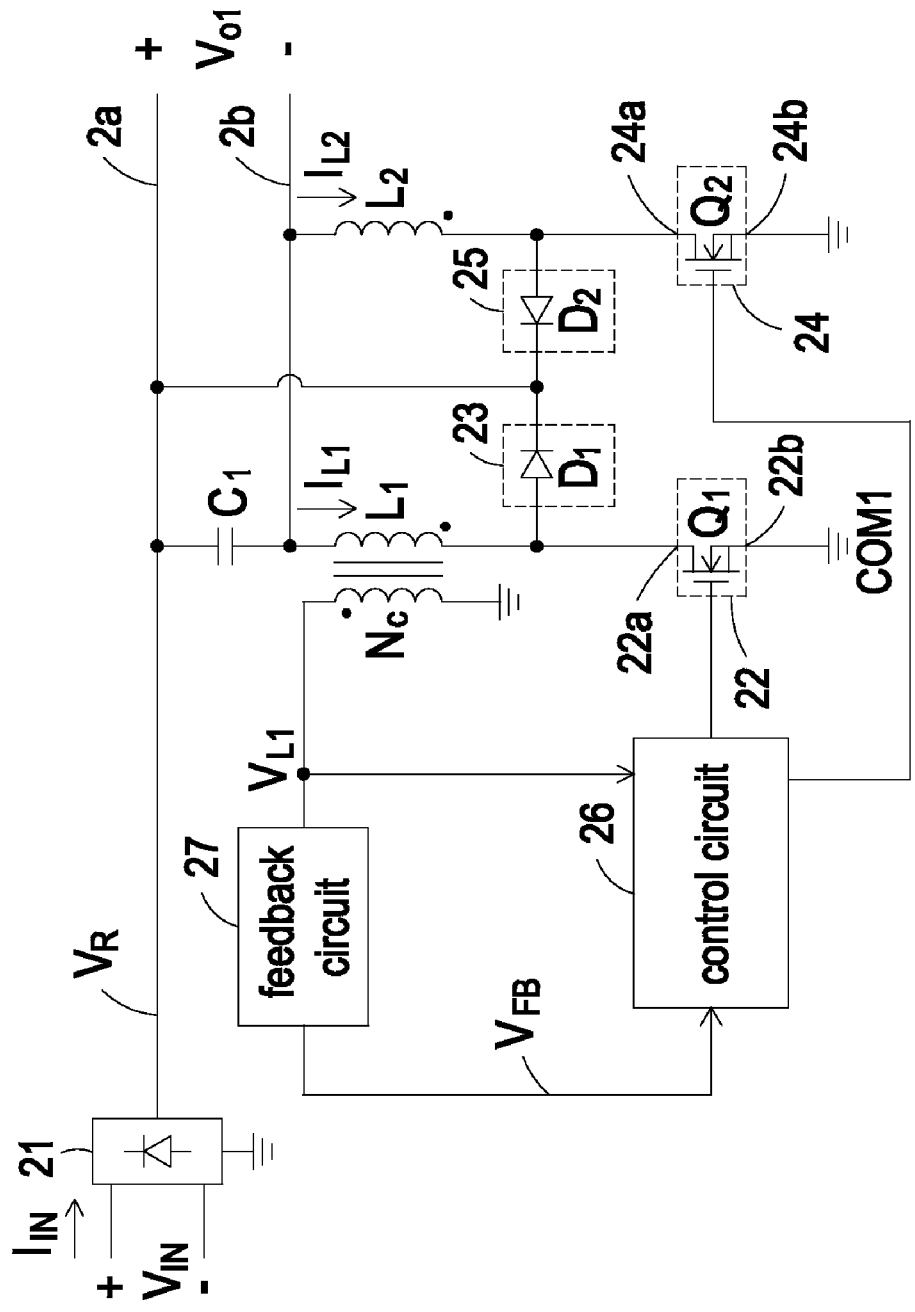
FIG. 2 is a schematic circuit diagram illustrating a power conversion circuit for decentralizing an input current according to an embodiment of the present invention.

FIG. 2 is a schematic circuit diagram illustrating a power conversion circuit for decentralizing an input current according to an embodiment of the present invention. The power conversion circuit 2 of FIG. 2 is a buck-type power conversion circuit. The power conversion circuit 2 can generate an output voltage $V_{o1}$ between a first output terminal 2a and a second output terminal 2b. As shown in FIG. 2, the power conversion circuit 2 principally comprises a capacitor $C_1$, a first inductor $L_1$, a first switching circuit 22, a first discharging circuit 23, a second inductor $L_2$, a second switching circuit 24, a second discharging circuit 25 and a control circuit 26. A first terminal of the capacitor $C_1$ is connected to the second output terminal 2b of the power conversion circuit 2, a first terminal of the first inductor $L_1$, and a first terminal of the second inductor $L_2$.

The first terminal of the first inductor $L_1$ is connected to the first terminal of the capacitor $C_1$ and the second output terminal 2b of the power conversion circuit 2. A second terminal of the first inductor $L_1$ is connected to a first conducting terminal 22a of the first switching circuit 22 and a first terminal of the first discharging circuit 23. The first conducting terminal 22a of the first switching circuit 22 is connected to the second terminal of the first inductor $L_1$ and the first terminal of the first discharging circuit 23. A second conducting terminal 22b of the first switching circuit 22 is connected to a common terminal COM1. A control terminal of the first switching circuit 22 is connected to the control circuit 26. Under control of the control circuit 26, the first switching circuit 22 is conducted (on status) or shut off (off status), so that the first inductor $L_1$ performs a charging operation or a discharging operation. The first terminal of the first discharging circuit 23 is interconnected between the first inductor $L_1$ and the first switching circuit 22. The second terminal of the first discharging circuit 23 is connected to the first output terminal 2a of the power conversion circuit 2. The first discharging circuit 23 is used for providing a discharging path of the first inductor $L_1$.

The first terminal of the second inductor $L_2$ is connected to the first terminal of the capacitor $C_1$ and the second output terminal 2b of the power conversion circuit 2. A second terminal of the second inductor $L_2$ is connected to a first conducting terminal 24a of the second switching circuit 24 and a first terminal of the second discharging circuit 25. A second conducting terminal 24b of the second switching circuit 24 is connected to the common terminal COM1. A control terminal of the second switching circuit 24 is connected to the control circuit 26. Under control of the control circuit 26, the second switching circuit 24 is conducted or shut off, so that the second inductor $L_2$ performs a charging operation or a discharging operation. The first terminal of the second discharging circuit 25 is interconnected between the second inductor $L_2$ and the second switching circuit 24. The second terminal of the second discharging circuit 25 is connected to the first output terminal 2a of the power conversion circuit 2. The second discharging circuit 25 is used for providing a discharging path of the second inductor $L_2$.

The control circuit 26 is connected to the control terminal of the first switching circuit 22 and the control terminal of the second switching circuit 24. The control circuit 26 can generate a pulse width modulation (PWM) signal to control on/off statuses of the first switching circuit 22 and the second switching circuit 24. According to the on/off statuses of the first switching circuit 22 and the second switching circuit 24, the first inductor $L_1$ and the second inductor $L_2$ respectively performs a charging operation or a discharging operation. In other words, according to the actions of the first switching circuit 22, the second switching circuit 24, the first inductor $L_1$ and the second inductor $L_2$, the power conversion circuit 2 generates the output voltage $V_{o1}$ between the first output terminal 2a and the second output terminal 2b. As a consequence, the heat generated by the first switching circuit 22 or the second switching circuit 24 during operation of the power conversion circuit 2 is less than that generated by the single switching circuit of the conventional power conversion circuit. Similarly, the heat generated by the first inductor $L_1$ or the second inductor $L_2$ during operation of the power conversion circuit 2 is less than that generated by the single inductor of the conventional power conversion circuit. Under this circumstance, the possibility of causing damage of the first switching circuit 22 and the second switching circuit 24, the first inductor $L_1$ or the second inductor $L_2$ from over-heating will be minimized. Hence, the quality of the power conversion circuit 2 is enhanced.

In this embodiment, the first switching circuit 22 and the second switching circuit 24 are alternately conducted under control of the control circuit 26. Under control of the control circuit 26, the second switching circuit 24 is successively conducted when the first switching circuit 22 is shut off. As a consequence, an input current $I_{IN}$ (e.g. an AC input current) is decentralized by the power conversion circuit 2.

In this embodiment, the power conversion circuit 2 further includes a feedback circuit 27. The first inductor $L_1$ further includes a current-induction winding $N_c$. A first terminal of the current-induction winding $N_c$ is connected to the control circuit 26 and the feedback circuit 27. A second terminal of the current-induction winding $N_c$ is connected to the common terminal COM1. The current-induction winding $N_c$ is used for inducing a first current $I_{L1}$ of the first inductor $L_1$ and issuing a corresponding first current inducing signal $V_{L1}$ to the control circuit 26. When the first switching circuit 22 is shut off, the first current $I_{L1}$ is zero because the first inductor $L_1$ discharges. According to the first current inducing signal $V_{L1}$, the control circuit 26 detects that the first current $I_{L1}$ is zero and thus controls the first switching circuit 22 to be conducted again.

The input terminal of the feedback circuit 27 is connected to the current-induction winding $N_c$. The output terminal of the feedback circuit 27 is connected to the control circuit 26. According to the first current inducing signal $V_{L1}$ transmitted from the current-induction winding $N_c$, the feedback circuit 27 generates a feedback signal $V_{FB}$ to the control circuit 26. According to the feedback signal $V_{FB}$, the control circuit 26 controls the on duration of the first switching circuit 22. Under control of the control circuit 26, the on duration of the second switching circuit 24 is adjusted to be substantially equal to the on duration of the first switching circuit 22. According to the actions of the first switching circuit 22, the second switching circuit 24, the first inductor $L_1$ and the second inductor $L_2$, the magnitude of the output voltage $V_o$ generated by the power conversion circuit 2 is maintained above the threshold value.

The input voltage $V_{IN}$ received by the power conversion circuit 2 is not limited to an AC input voltage. In a case that the input voltage $V_{IN}$ is an AC input voltage, the power conversion circuit 2 further includes a rectifier circuit 21. An example of the rectifier circuit 21 includes but is not limited to a bridge rectifier circuit. The output terminal of the rectifier circuit 21 is connected to the second terminal of the capacitor $C_1$ and the first output terminal 2a of the power conversion circuit 2. The AC input voltage $V_{IN}$ is rectified by the rectifier circuit 21 into a rectified voltage $V_R$. In some embodiments, the input voltage $V_{IN}$ received by the power conversion circuit 2 is a DC input voltage, and the rectifier circuit 21 is exempted from the power conversion circuit 2.

Figure 3:
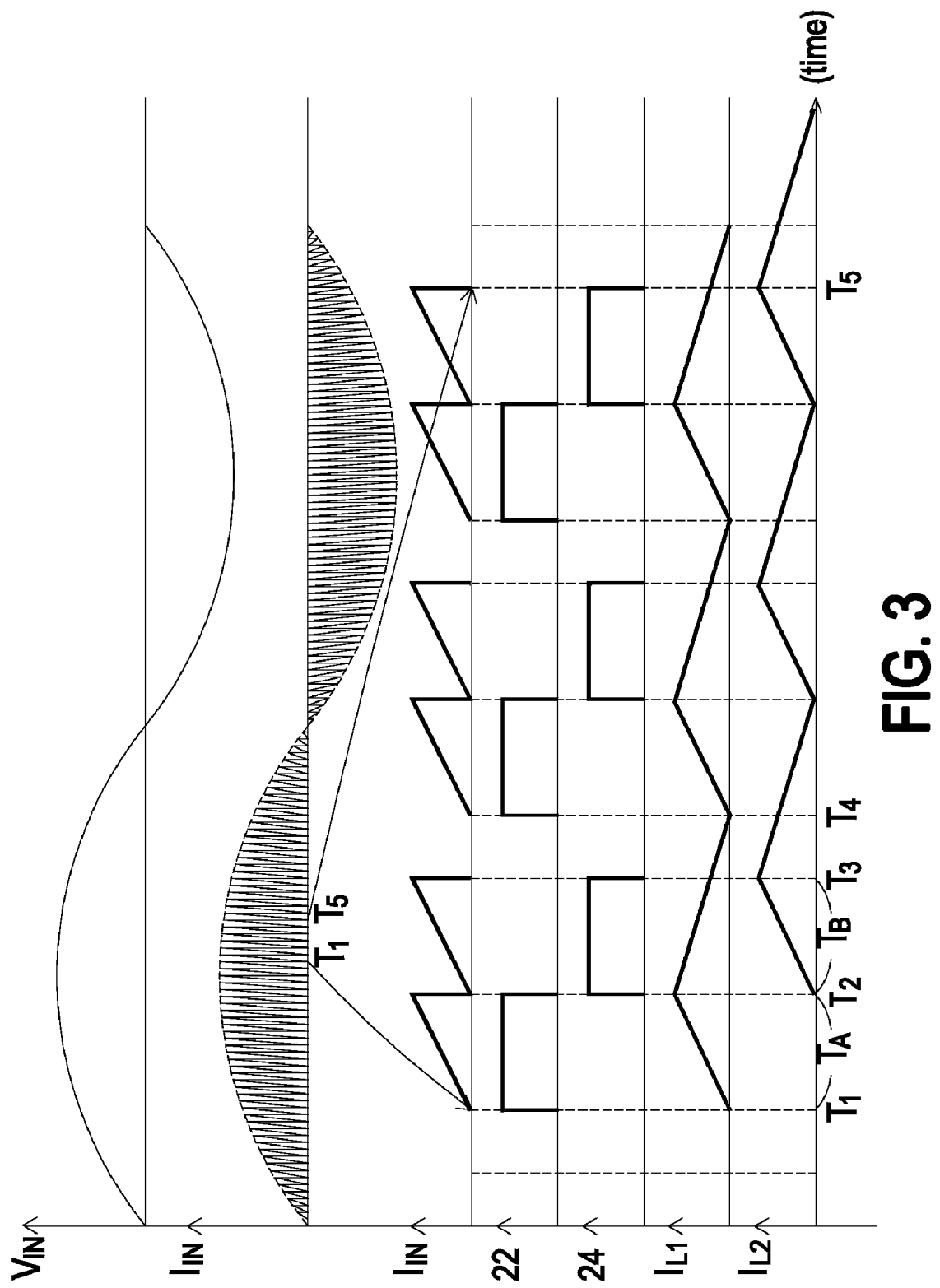
FIG. 3 is a timing waveform diagram illustrating the corresponding voltage signals and current signals processed in the power conversion circuit of the present invention.

Hereinafter, the operations of the power conversion circuit 2 will be illustrated with reference to FIGS. 2 and 3. FIG. 3 is a timing waveform diagram illustrating the corresponding voltage signals and current signals processed in the power conversion circuit of the present invention.

At the time spot $T_1$, the first switching circuit 22 is conducted under control of the control circuit 26. Meanwhile, the input current $I_{IN}$ begins to charge the first inductor $L_1$. That is, the first current $I_{L1}$ of the first inductor $L_1$ will successively pass through the capacitor $C_1$, the first inductor $L_1$ and the first switching circuit 22, so that the first inductor $L_1$ is charged by the first current $I_{L1}$. During the charging process, the magnitude of the first current $I_{L1}$ of the first inductor $L_1$ gradually increases.

Since the on duration of the first switching circuit 22 is controlled by the control circuit 26 according to the feedback signal $V_{FB}$, the first switching circuit 22 is switched from the on status to the off status after an on duration $T_A$ of the first switching circuit 22 (i.e. from the time spot $T_1$ to the time spot $T_2$). At the time spot $T_2$, the first inductor $L_1$ begins to discharge the stored electric energy through the discharging path offered by the first discharging circuit 23. As such, the magnitude of the first current $I_{L1}$ of the first inductor $L_1$ begins to decrease. In addition, when the first switching circuit 22 is shut off, the second switching circuit 24 is successively conducted under control of the control circuit 26. In other words, the second switching circuit 24 is conducted at the time spot $T_2$, and the input current $I_{IN}$ begins to charge the second inductor $L_2$. That is, the second current $I_{L2}$ of the second inductor $L_2$ will successively pass through the capacitor $C_1$, the second inductor $L_2$ and the second switching circuit 24, so that the second inductor $L_2$ is charged by the second current $I_{L2}$. During the charging process, the magnitude of the second current $I_{L2}$ of the second inductor $L_2$ gradually increases.

In this embodiment, the on duration of the second switching circuit 24 is substantially equal to the on duration of the first switching circuit 22 under control of the control circuit 26. After an on duration $T_B$ of the second switching circuit 24 (i.e. from the time spot $T_2$ to the time spot $T_3$), the second switching circuit 24 is switched from the on status to the off status under control of the control circuit 26. In this embodiment, $T_B$ is substantially equal to $T_A$. At the time spot $T_3$, the second inductor $L_2$ begins to discharge the stored electric energy through the discharging path offered by the second discharging circuit 25. As such, the magnitude of the second current $I_{L2}$ of the second inductor $L_2$ begins to decrease.

Alternatively, the on duration of the second switching circuit 24 may be different from the on duration of the first switching circuit 22 under control of the control circuit 26. According to the practical requirements of the power conversion circuit 2, if the inductance value of the first current $I_{L1}$ is equal to the inductance value of the second inductor $L_2$, on duration of the second switching circuit 24 and the on duration of the first switching circuit 22 are adjustable.

At the time spot $T_4$, the control circuit 26 detects that the magnitude of the first current $I_{L1}$ of the first inductor $L_1$ decreases to zero according to the first current inducing signal $V_{L1}$. Meanwhile, the first switching circuit 22 is switched from the off status to the on status, and the input current $I_{IN}$ begins to recharge the first inductor $L_1$. As such, the magnitude of the first current $I_{L1}$ of the first inductor $L_1$ gradually increases.

Please refer to FIGS. 3 and 2 again. Under control of the control circuit 26, the first switching circuit 22 and the second switching circuit 24 are alternately conducted, and the second switching circuit 24 is successively conducted when the first switching circuit 22 is shut off. As a consequence, the AC input current $I_{IN}$ of the power conversion circuit 2 is decentralized by alternately conducting the first switching circuit 22 and the second switching circuit 24. In comparison with the transient response of the AC input current of the conventional power conversion circuit, the transient response of the AC input current of the present power conversion circuit has lower and more decentralized peak values and smaller harmonic waves. For filtering the harmonic waves and reducing the electromagnetic interference, the power conversion circuit 2 further includes a small-sized electromagnetic interference filter circuit 20 (see FIG. 4). As shown in FIG. 3, the envelop curve of the AC input current $I_{IN}$ of the power conversion circuit 2 (as is indicated as a dotted line) is similar to the waveform of the AC input voltage $V_{IN}$. As consequence, the power conversion circuit 2 has a power factor correction function, and the power loss during operation of the power conversion circuit 2 is reduced.

In the above embodiments, the first switching circuit 22 includes a first switch element $Q_1$ and the second switching circuit 24 includes a second switch element $Q_2$. Each of the first switch element $Q_1$ and the second switch element $Q_2$ includes but is not limited to a metal oxide semiconductor field effect transistor (MOSFET) or a bipolar junction transistor (BJT). Furthermore, the first discharging circuit 23 and the second switching circuit 24 are implemented by a first diode $D_1$ and a second diode $D_2$, respectively.

Figure 4:
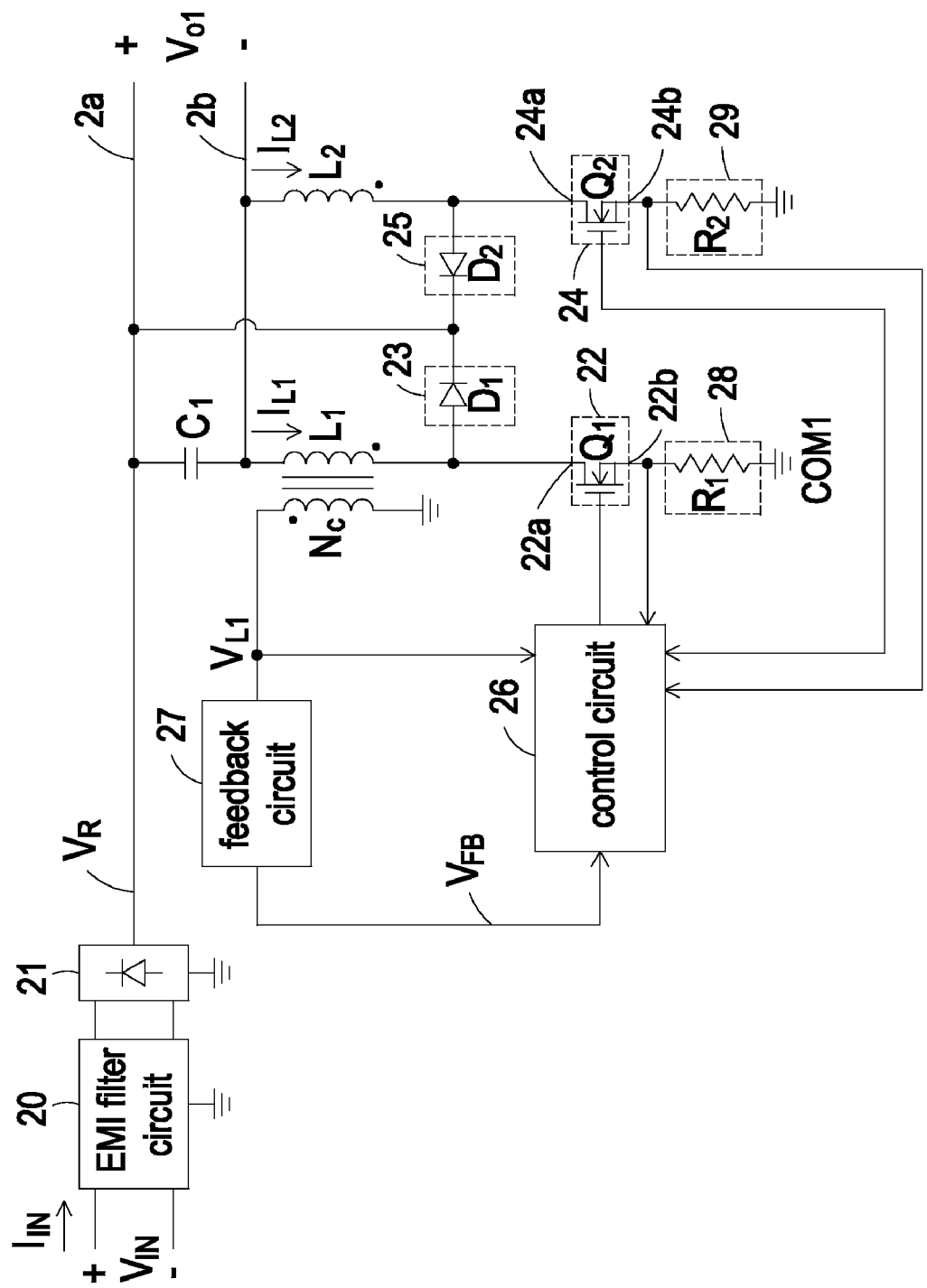
FIG. 4 is a schematic circuit diagram illustrating a power conversion circuit for decentralizing an input current according to another embodiment of the present invention.

FIG. 4 is a schematic circuit diagram illustrating a power conversion circuit for decentralizing an input current according to another embodiment of the present invention. As shown in FIG. 4, the power conversion circuit 2 further includes an electromagnetic interference filter circuit 20, a first current-detecting circuit 28 and a second current-detecting circuit 29. The electromagnetic interference filter circuit 20 is connected to the input terminal of the filter circuit 21 for filtering the harmonic waves and reducing the electromagnetic interference. The first current-detecting circuit 28 is interconnected between the first switching circuit 22 and the common terminal COM1 in series for detecting the current flowing through the first switching circuit 22. According to the current flowing through the first switching circuit 22, the first current-detecting circuit 28 issues a first current-detecting signal to the control circuit 26. If an over-current phenomenon occurs when the current flowing through the first switching circuit 22, the control circuit 26 will control the first switching circuit 22 to be shut off. The second current-detecting circuit 29 is interconnected between the second switching circuit 24 and the common terminal COM1 in series for detecting the current flowing through the second switching circuit 24. According to the current flowing through the second switching circuit 24, the second current-detecting circuit 29 issues a second current-detecting signal to the control circuit 26. If an over-current phenomenon occurs when the current flowing through the second switching circuit 24, the control circuit 26 will control the second switching circuit 24 to be shut off. In this embodiment, the first current-detecting circuit 28 and the second current-detecting circuit 29 are implemented by a first resistor $R_1$ and a second resistor $R_2$, respectively. Alternatively, the first current-detecting circuit 28 and the second current-detecting circuit 29 are current transformers.

From the above description, since the first switching circuit and the second switching circuit of the power conversion circuit of the present invention is connected to the low-voltage terminal, no bootstrap circuit is required to drive the switching circuits and the fabricating cost is reduced. Moreover, since the power conversion circuit of the present invention generates the output voltage by means of the first switching circuit, the second switching circuit, the first inductor and the second inductor, the heat generated by the first switching circuit, the second switching circuit, the first inductor and the second inductor during operation of the power conversion circuit is less than that generated by the single switching circuit and the single inductor of the conventional power conversion circuit. Under this circumstance, the possibility of causing damage from over-heating will be minimized. Moreover, since the first switching circuit and the second switching circuit are alternately conducted and the second switching circuit is successively conducted when the first switching circuit is shut off under control of the control circuit, the AC input current of the power conversion circuit is decentralized. In comparison with the transient response of the AC input current of the conventional power conversion circuit, the transient response of the AC input current of the present power conversion circuit has lower and more decentralized peak values and smaller harmonic waves. Moreover, since the envelop curve of the AC input current is similar to the waveform of the AC input voltage, the power conversion circuit of the present invention has a power factor correction function. Under this circumstance, a small-sized electromagnetic interference filter circuit is used for filtering the harmonic waves and reducing the electromagnetic interference, and thus the fabricating cost of the power conversion circuit is further reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit for decentralizing input current, said power conversion circuit generating an output voltage between a first output terminal and a second output terminal, said power conversion circuit comprising:
   a capacitor connected to said first output terminal and said second output terminal of said power conversion circuit;
   a first inductor connected to said capacitor;
   a first switching circuit connected to said first inductor and a common terminal;
   a first discharging circuit connected to said first inductor, said first switching circuit and said first output terminal;
   a second inductor connected to said capacitor and said first inductor, wherein said second inductor is connected in parallel with said first inductor;
   a second switching circuit connected to said second inductor and said common terminal;
   a second discharging circuit connected to said second inductor, said second switching circuit and said first output terminal; and
   a control circuit connected to said first switching circuit and said second switching circuit for controlling on/off statuses of said first switching circuit and said second switching circuit, so that said first inductor and said second inductor perform a charging operation or a discharging operation and said power conversion circuit generates said output voltage through said first inductor and said second inductor,
   wherein under control of said control circuit, said first switching circuit and said second switching circuit are alternately conducted, and said second switching circuit is successively conducted when said first switching circuit is shut off, and said first inductor is connected between said capacitor and an input terminal of said first discharging circuit, and said second inductor is connected between said capacitor and an input terminal of said second discharging circuit.

2. The power conversion circuit according to claim 1 wherein said power conversion circuit is a buck-type power conversion circuit.

3. The power conversion circuit according to claim 1 wherein said first switching circuit and said second switching circuit include a first switch element and a second switch element, respectively.

4. The power conversion circuit according to claim 1 wherein said first discharging circuit and said second discharging circuit are implemented by a first diode and a second diode, respectively.

5. The power conversion circuit according to claim 1 further comprising a rectifier circuit, wherein an output terminal of said rectifier circuit is connected to said capacitor and said first output terminal of said power conversion circuit for rectifying an AC input voltage into a rectified voltage.

6. The power conversion circuit according to claim 1 further comprising an electromagnetic interference filter circuit for filtering harmonic waves.

7. The power conversion circuit according to claim 1 wherein an on duration of said first switching circuit is equal to an on duration of said second switching circuit under control of said control circuit.

8. The power conversion circuit according to claim 1 wherein said first inductor further includes a current-induction winding connected to said control circuit and said common terminal for inducing a first current of said first inductor and issuing a first current inducing signal to said control circuit according to said first current, wherein when said first current is zero, said control circuit controls said first switching circuit to be conducted according to said first current inducing signal.

9. The power conversion circuit according to claim 8 further comprising a feedback circuit connected to said current-induction winding and said control circuit for generating a feedback signal to said control circuit according to said first current inducing signal, so that said control circuit controls an on duration of said first switching circuit according to said feedback signal.

10. The power conversion circuit according to claim 1 further comprising a first current-detecting circuit interconnected between said first switching circuit and said common terminal for detecting a current flowing through said first switching circuit, thereby generating a corresponding first current-detecting signal to said control circuit, wherein said first switching circuit is shut off under control of said control circuit if an over-current phenomenon of said first switching circuit occurs.

11. The power conversion circuit according to claim 10 wherein said first current-detecting circuit includes a first resistor.

12. The power conversion circuit according to claim 1 further comprising a second current-detecting circuit interconnected between said second switching circuit and said common terminal for detecting the current flowing through said second switching circuit, thereby generating a corresponding second current-detecting signal to said control circuit, wherein said second switching circuit is shut off under control of said control circuit if an over-current phenomenon of said second switching circuit occurs.

13. The power conversion circuit according to claim 12 wherein said second current-detecting circuit includes a second resistor.

* * * * *